(12) United States Patent
Tabanelli

(10) Patent No.: US 8,211,347 B2
(45) Date of Patent: Jul. 3, 2012

(54) METHOD FOR SOCKET-FORMING AN END OF A THERMOPLASTIC MATERIAL TUBE, IN PARTICULAR OF A POLYOLEFINIC MATERIAL, TUBE FOR PRESSURIZED FLUIDS

(75) Inventor: Giorgio Tabanelli, Cotignola (IT)

(73) Assignee: SICA S.p.A., Alfonsine (IT)

( * ) Notice: Subject to any disclaimer, the term of this patent is extended or adjusted under 35 U.S.C. 154(b) by 373 days.

(21) Appl. No.: 12/095,633

(22) PCT Filed: Dec. 1, 2006

(86) PCT No.: PCT/EP2006/069179
§ 371 (c)(1),
(2), (4) Date: Jun. 11, 2010

(87) PCT Pub. No.: WO2007/063122
PCT Pub. Date: Jun. 7, 2007

(65) Prior Publication Data
US 2010/0264564 A1    Oct. 21, 2010

(30) Foreign Application Priority Data
Dec. 2, 2005    (EP) .................................... 05425862

(51) Int. Cl.
*B29C 57/00*    (2006.01)
(52) U.S. Cl. ......................... 264/296; 264/322; 264/323
(58) Field of Classification Search .................. 264/292, 264/296, 322, 323; 425/340, 392, 393, 403
See application file for complete search history.

(56) References Cited

U.S. PATENT DOCUMENTS

| | | | |
|---|---|---|---|
| 3,728,059 A | | 4/1973 | De Putter |
| 3,899,565 A | * | 8/1975 | de Putter et al. .............. 264/296 |
| 3,991,150 A | | 11/1976 | De Putter et al. |
| 4,107,249 A | | 8/1978 | Murai et al. |
| 4,157,372 A | | 6/1979 | Kyomen |
| 4,406,852 A | * | 9/1983 | Riegel .......................... 264/296 |
| 4,430,052 A | | 2/1984 | Olsson et al. |

FOREIGN PATENT DOCUMENTS

| | | |
|---|---|---|
| DE | 16 79 897 A1 | 4/1971 |
| DE | 25 07 023 A1 | 8/1975 |
| GB | 1 324 886 | 7/1973 |
| GB | 1 382 360 | 1/1975 |
| JP | 58 179613 | 10/1983 |
| JP | 58 185211 | 10/1983 |
| JP | 58 220704 A | 12/1983 |

OTHER PUBLICATIONS

Dupuis, International Search Report for International Patent Application No. PCT/EP2006/069179, 4 pp., Mar. 26, 2007.

* cited by examiner

*Primary Examiner* — Joseph Del Sole
*Assistant Examiner* — David N Brown, II
(74) *Attorney, Agent, or Firm* — Klarquist Sparkman, LLP

(57) ABSTRACT

A method for socket-forming an end of a thermoplastic material tube, according to which the end is firstly widened without forming the socket and is then stabilized; the widened and stabilized end being finally socket-formed.

18 Claims, 6 Drawing Sheets

US 8,211,347 B2

METHOD FOR SOCKET-FORMING AN END OF A THERMOPLASTIC MATERIAL TUBE, IN PARTICULAR OF A POLYOLEFINIC MATERIAL, TUBE FOR PRESSURIZED FLUIDS

CROSS REFERENCE TO RELATED APPLICATIONS

This is a 35 U.S.C. 371 U.S. National Stage of International Application No. PCT/EP2006/069179, filed Dec. 1, 2006, which was published in English under PCT Article 21(2), which in turn claims the benefit of European Patent Application No. 05425862.9, filed Dec. 2, 2005. Both applications are incorporated herein in their entirety.

TECHNICAL FIELD

The present invention relates to a method for socket forming an end of a thermoplastic material tube.

The present invention finds particularly advantageous application in the socket forming of tubes made of polyolefinic material such as, for example, polyethylene or polypropylene, presenting a relative high thickness, and thus capable of conveying pressurised fluids, to which explicit reference will be made in the following discussion without however loosing in generality.

The present invention finds further particularly advantageous application in a tube socket forming machine which is to be installed in an automatic line for manufacturing tubes at the exit of an extrusion unit of the tubes themselves, to which explicit reference will be made without however loosing in generality in the discussion that follows.

BACKGROUND ART

There are generally four types of known methods followed to form sockets on the ends of polyolefinic material tubes for pressurised fluids.

According to a first method, the tube is manufactured in an injection moulding process which allows the socket forming of its end.

According to another of the known methods mentioned above, the end of the tube is defined by a tubular union, which is firstly socket-formed in an injection moulding process and is then head-welded to the tube normally made by extrusion.

Evidently, the first two methods of the known type described above present some drawbacks mainly deriving from the fact that such methods are relatively complex and costly, requiring relatively long actuation times and not being suitable to be used in an automatic tube manufacturing line.

According to the third of the abovementioned known methods, the end of the tube is firstly heated and then formed by forcing the polyolefinic material against a shaped mould external to the tube by means of compressed air fed inside the tube, and is finally further formed by forcing the polyolefinic material against a shaped mould inside the tube by means of compressed air fed against the outer surface of the tube itself. Such method presents some drawbacks mainly deriving from the fact that the two forming steps described above require relatively high deformation forces and times.

According to the last of the abovementioned known methods, the end of the tube is firstly heated, then formed by forcing the polyolefinic material against a shaped mould external to the tube by means of compressed air fed inside the tube, then cooled, and finally mechanically compressed by means of two mobile jaws so as to obtain the final dimensions of the socket end by combining the compression action of the mobile jaws with the elastic behaviour of the polyolefinic material. The latter method requires relatively high deformation forces and times, is essentially incapable of ensuring a correct value of the thickness of the socket end and therefore entails a final step of monitoring the thickness of the socket end itself.

DISCLOSURE OF INVENTION

It is the object of the present invention to provide a method for socket forming an end of a thermoplastic material tube which is free from the drawbacks described above.

According to the present invention, a method for socket-forming an end of a thermoplastic material tube according to the accompanying claims is provided.

BRIEF DESCRIPTION OF THE DRAWINGS

The present invention will now be described with reference to the accompanying drawings illustrating a non-limitative embodiment example, in which.

BEST MODE FOR CARRYING OUT THE INVENTION

Figure 1:
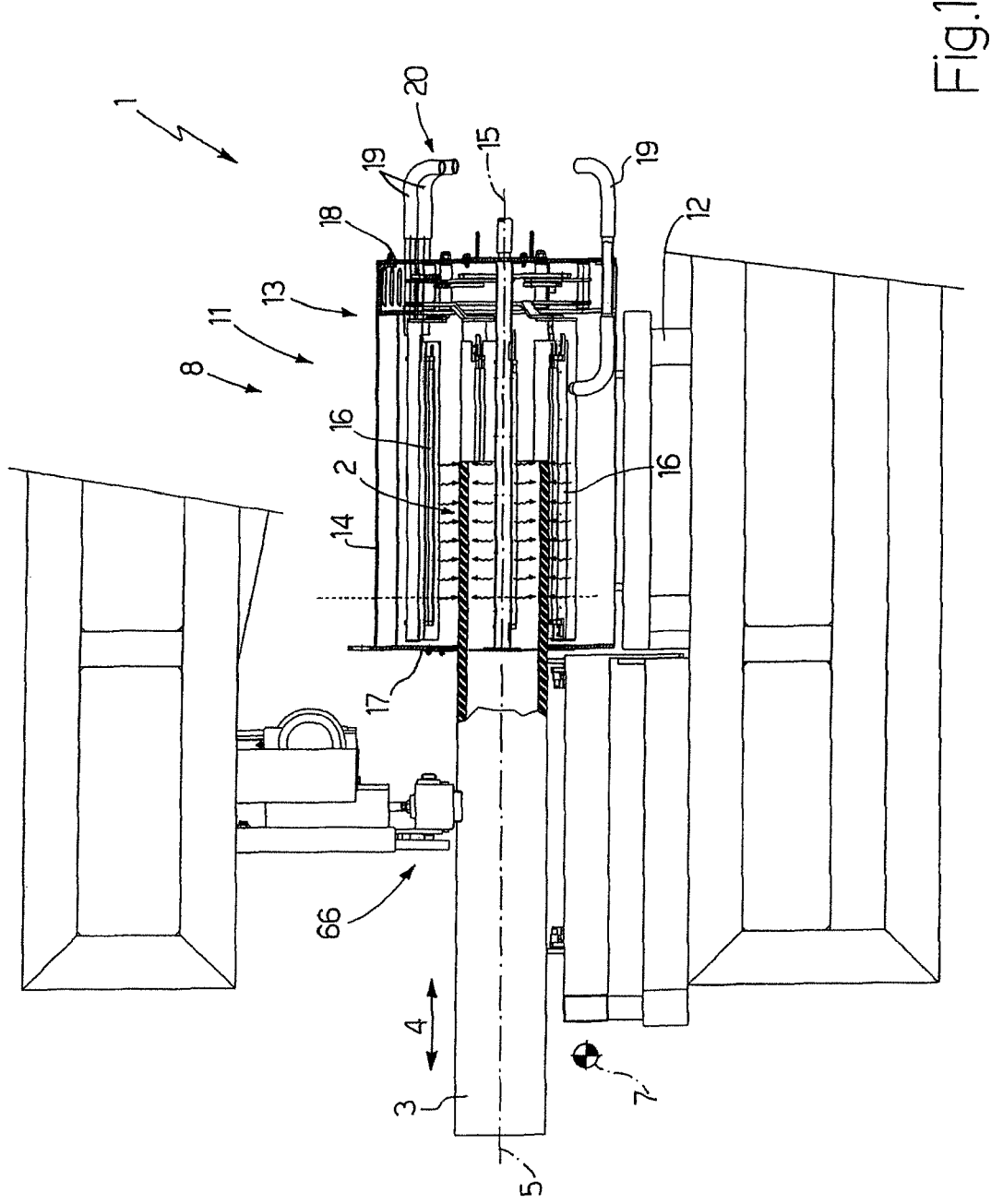
FIG. 1 is a schematic side view, with parts in section, of a first detail of a preferred embodiment of the socket forming machine according to the present invention.

With reference to FIG. 1, it is indicated as a whole by 1 a machine for socket forming ends 2 of tubes 3, each of which presents, in the case in point, an essentially cylindrically shaped transversal section, is made of polyolefinic material, e.g. polyethylene or polyethylene, presents a relatively high thickness to be used to convey pressurised fluids, and is produced in an extrusion unit of the known type and not shown.

The machine 1 is connected to the extrusion unit (not shown) at a transfer station (not shown), comprises a first feeding device of the known type and not shown for feeding each tube 3 in a horizontal direction 4 parallelly to a longitudinal axis 5 of the tube 3 from the transfer station to a loading station (not shown), at which the tube 3 is taken by a second feeding device of the known type and not shown for feeding the tube 3 itself in a horizontal direction 7 transversal to the direction 4 and perpendicular to the surface of the sheet in figures from 1 to 6.

The tube 3 is fed by the device 6 with its axis 5 arranged parallelly to the direction 4 through a heating station 8 (FIG. 1), a widening and heating station 9 (FIGS. 2 and 3), and a socket forming and cooling station 10 (FIGS. 4-6) arranged in sequence and in order along direction 7.

The station 8 is provided with a heating device 11 comprising a carriage 12 movable in direction 4 under the bias of an actuating device of the known type and not shown, and an oven 13 essentially cylindrical fitted over the carriage 12 itself. The oven 13 comprises an essentially cylindrical casing 14, which presents a longitudinal axis 15 essentially parallel to the direction 4, supports inside a plurality of heating lamps 16 parallel to the direction 4 and uniformly distributed about the axis 15, and is axially limited by two plates 17, 18 orthogonal to the axis 15 itself, and in which the plate 17 is an annular plate adapted to be engaged, in use, by the ends 2 of the tubes 3, and the plate 18 is a circular plate crossed by conduits 19 of a pneumatic cooling circuit 20 of the lamps 16.

In use, the tube 3 is fed by the device 6 in direction 7 and into station 8, where the tube 3 is arranged coaxially to axis 15 and with the end 2 facing the device 11. Once the tube 3 is positioned into the station 8, the device 11 is shifted by means of the carriage 12 in direction 4 from a retracted home position (not shown), in which the tube 3 is arranged outside the casing 14, to an advanced operative position (FIG. 1), in which the end 2 engages the plate 17, is arranged between the lamps 16, and is heated by the lamps 16 themselves to a temperature anyway lower than the deformation temperature of the polyolefinic material of the tube 3 itself, i.e. lower than the minimum temperature needed to socket-form the end 2 of the tube 3. With this regard, it is appropriate to specify that, in order to uniformly heat the end 2, the tube 3 is continuously turned about the axis 15 by means of an actuating device 66 of the known type.

Figure 2:
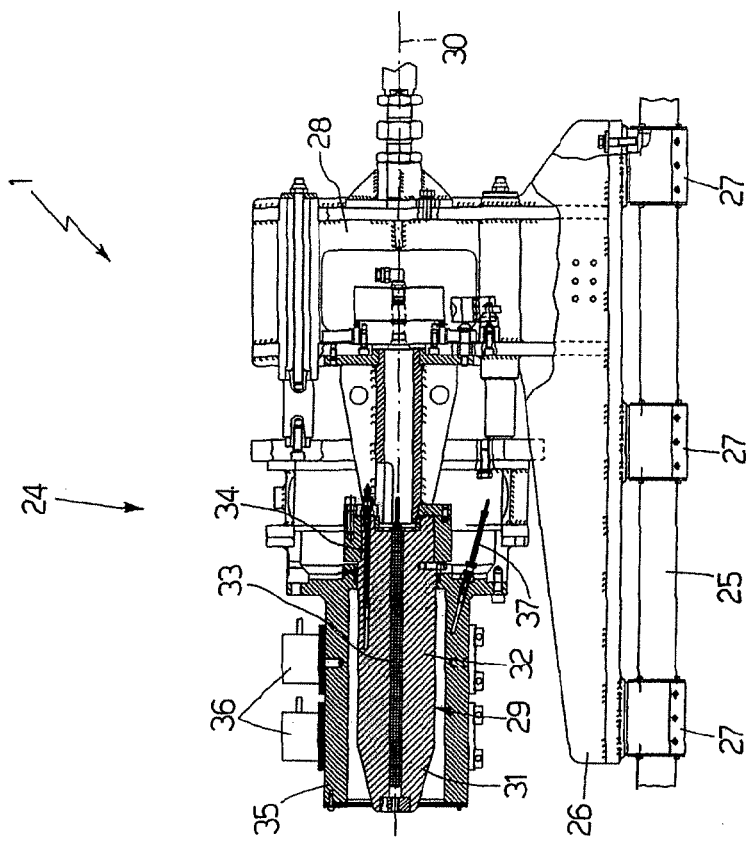
FIGS. 2 and 3 are two schematic side views, with parts in section, of a second detail of the machine in FIG. 1 shown in two different operative positions.
Figure 2:
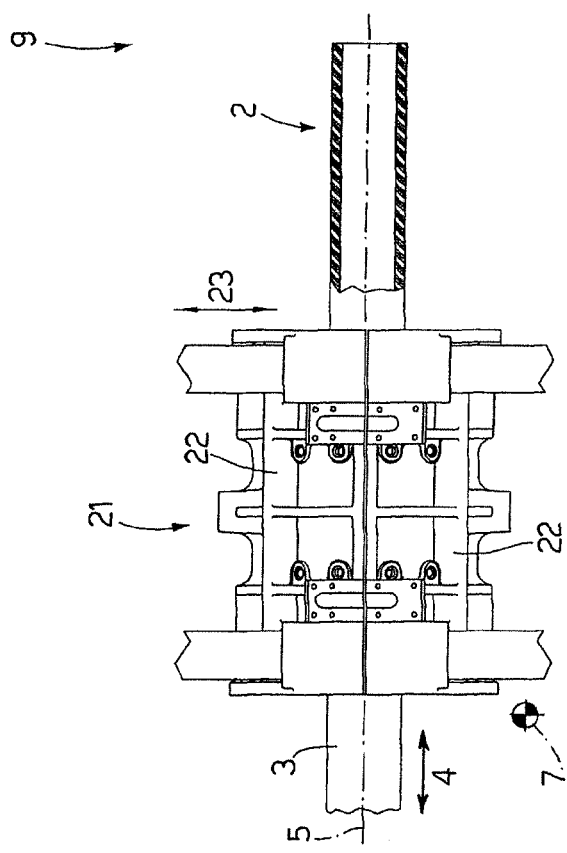
Figure 3:
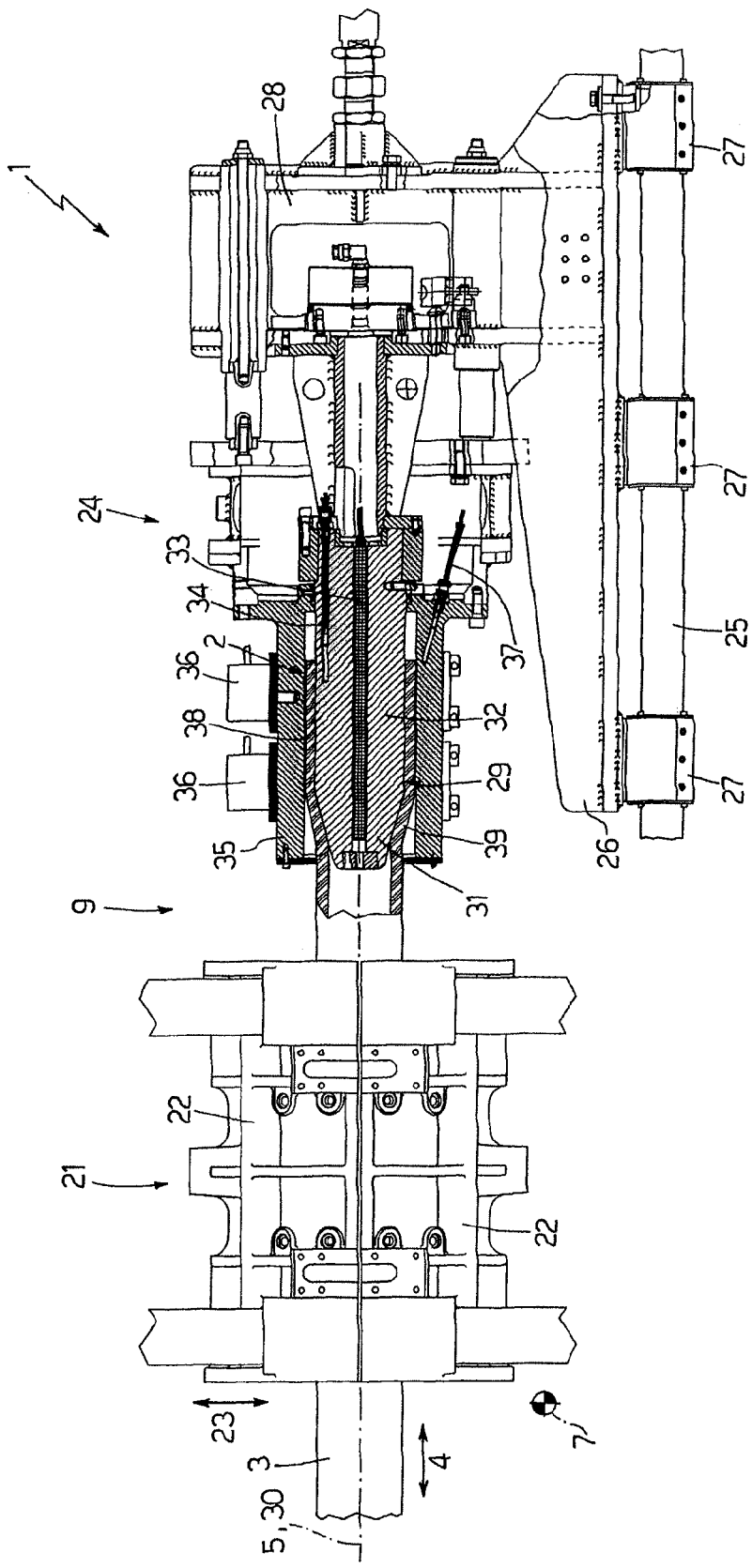

As shown in FIGS. 2 and 3, station 9 is provided with a clamping device 21 for the tube 3 comprising two clamping jaws 22, which present an essentially semi-cylindrical shape, and are reciprocally movable under the bias of an actuating device of the known type and not shown in a vertical direction 23 orthogonal to directions 4 and 7 between a clamping position (FIGS. 2 and 3) and a release position (not shown) of the tube 3.

Station 9 is also provided with a widening and heating device 24 comprising a guide 25, which is fastened to a frame of the machine 1 parallel to direction 4, and supports a slide 26 slidingly coupled to the guide 25 by means of three runners 27 to perform, along the guide 25, straight shifts in direction 4 itself.

The slide 26 presents an essentially vertical upright 28, which extends upwards in direction 23, and supports a widening and heating mandrel 29, which protrudes from the upright 28 in direction 4, presents a longitudinal axis 30 parallel to direction 4 itself, and comprises an essentially truncated cone shaped end portion 31 and an essentially cylindrical intermediate portion 32, which faces the upright 28, and presents a diameter wider than the diameter of the tube 3.

The mandrel 29 is heated by means of an electrical resistor 33, whose operation is controlled, in the case in point, by a thermocouple 34 inserted inside the portion 32, and cooperates with an external heating liner 35, which presents an essentially cylindrical shape, extends about the mandrel 29 coaxially to axis 30, and is heated by a pair of electrical resistors 36, whose operation is controlled, in the case in point, by a thermocouple 37 inserted in the liner 35 itself.

In use, once heated in station 8, the tube 3 is firstly fed by the device 6 in direction 7 and into the station 9 so as to be arranged coaxially to the axis 30 and with the end 2 facing the device 24, and is then clamped between the jaws 22 of the clamping device 21. At this point, the slide 26 is shifted in direction 4 from a retracted home position (FIG. 2), in which the tube 3 is arranged at a determined distance from the mandrel 29, to an advanced operative position (FIG. 3), in which the mandrel 29 engages the end 2. By combining the mechanical dilatation action exerted by the portion 32 of the mandrel 29 with the thermal action exerted by the mandrel 29 and by the liner 35 and the time of permanence of the mandrel 29 inside the tube 3, the end 2 is permanently widened by exploiting the viscoelastic and viscoplastic behaviour of the polyolefinic materials so as to present a cylindrical end segment 38 and an essentially truncated cone shaped intermediate segment 39 between the segment 38 and the remaining part of the tube 2.

With reference to the above, it is appropriate to specify that:
the radial distance between the liner 35 and the portion 32 approximates by excess the thickness of the segment 38 to avoid the contact between the liner 35 and the segment 38;
the end 2 is simply widened by the mandrel 29 and is in no way socket-formed; and
the widening of the end 2 may be obtained also at ambient temperature without the thermal contribution of the electrical resistors 33, 36 which contribute solely to accentuating the viscoplastic behaviour of the polyolefinic material of the tube 3.

Figure 4:
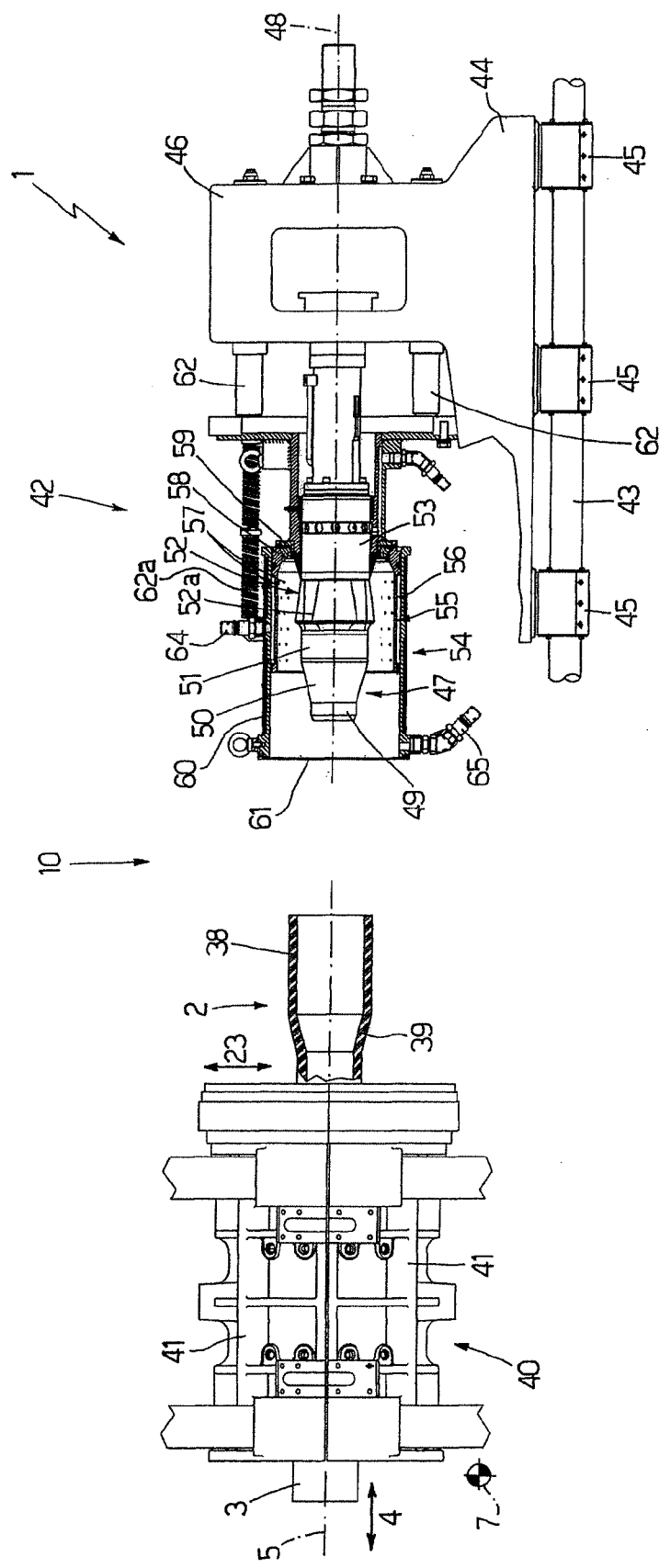
FIGS. 4, 5 and 6 are three schematic side views, with parts in section, of a third detail of the machine in FIG. 1 shown in three different operative positions.
Figure 5:
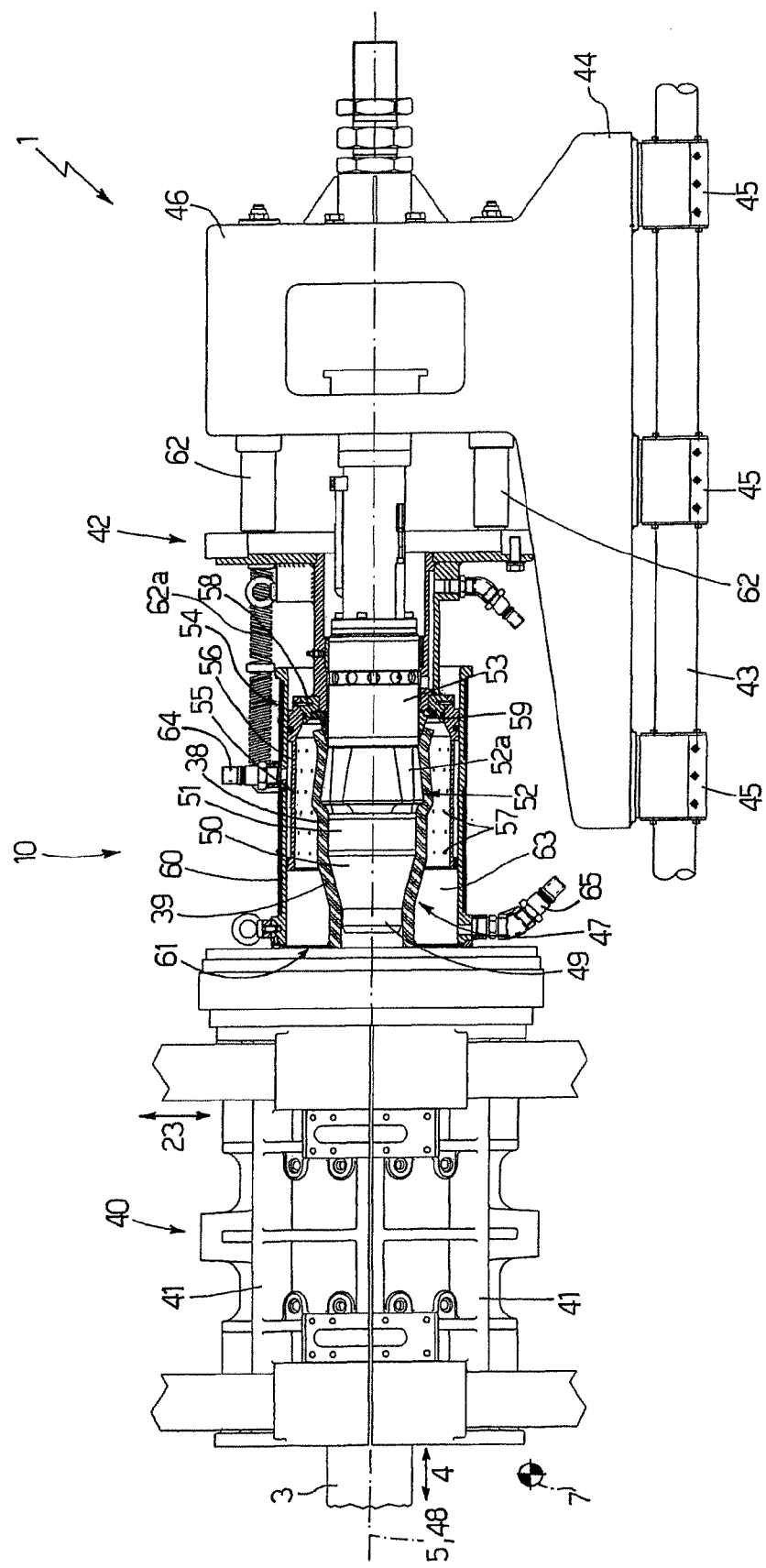
Figure 6:
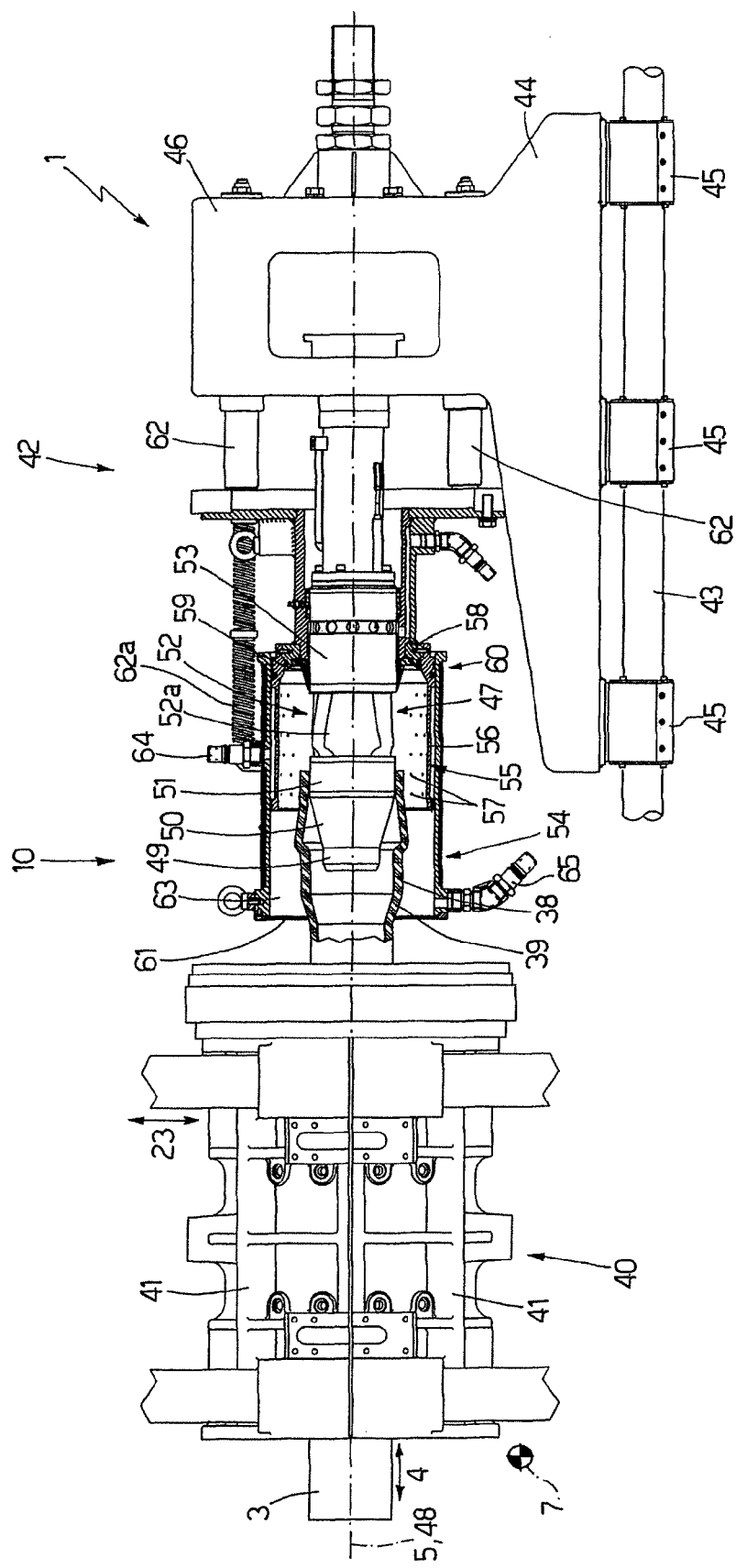

With reference to FIGS. 4, 5, and 6, station 10 is provided with a clamping device 40 for the tube 3 comprising two clamping jaws 41, which present an essentially semi-cylindrical shape, and are reciprocally movable under the bias of an actuating device of the known type and not shown in direction 23 between a clamping position (FIGS. 4, 5 and 6) and a release position (not shown) of the tube 3.

Station 10 is also provided with a forming and cooling device 42 comprising a guide 43, which is fastened to the frame of the machine 1 parallel to direction 4, and supports a slide 44 slidingly coupled to the guide 43 by means of three runners 45 to perform, along the guide 43, straight shifts in the direction 4 itself.

The slide 44 presents an essentially vertical upright 46, which extends upwards in direction 23, and supports a forming mandrel 47 of the known type, which protrudes from the upright 46 in direction 4, presents a longitudinal axis 48 parallel to the direction 4 itself, and comprises an essentially cylindrical end portion 49 presenting a diameter essentially equal to the inner diameter of the tube 3, a truncated cone shaped portion 50 connected to the portion 49 and presenting a conicity essentially equal to the conicity of the segment 39, a cylindrical portion 51 presenting a diameter essentially equal to the diameter of the segment 38, a portion 52 with expandable inserts 52a, and a cylindrical portion 53 facing the upright 46. The inserts 52a are movable between a contracted home position (FIG. 6), in which the portion 52 presents a diameter approximating by defect the diameter of the portion 51, and an expanded operative position (FIGS. 4 and 5), in which the portion 52 protrudes over the portion 51.

The mandrel 47 extends through an external container essentially coaxial to the axis 48 and comprises a bell 55, which is limited laterally by a cylindrical wall 56 provided with a plurality of holes 57 made radially through the wall 56 itself, and is axially limited, at its end facing the upright 46, by a bottom wall 58, which is essentially orthogonal to the axis 48, is fluid-tightly coupled with the mandrel 47, and is provided with an essentially truncated cone shaped annular collar 59.

The bell 55 is also slidingly coupled to the upright and, therefore, to the mandrel 47 to shift, which respect to the upright 46 and the mandrel 47, in direction 4 under the bias of an actuating device 60 of the known type.

The container 54 further comprises an external liner 61, which is mounted coaxially to axis 48, is fluid-tightly coupled to the wall 56, is axially limited by an annular flexible element 62 orthogonal to the axis 48 itself, and is slidingly coupled to the bell 55 by at least one spring 62a essentially parallel to direction 4.

In use, after ending the widening step of the end 2 in station 9, the mandrel 29 is shifted to its retracted home position, the shape of the end segment 38 is stabilised so as to maintain a diameter anyway larger than the diameter of the tube 3, the jaws 22 are opened, and the tube 3 is fed by the device 6 in direction 7 and into the station 10.

At station 10, the tube 3 is arranged coaxial to the axis 48 and with the end 2 facing the device 42, and is therefore clamped between the jaws 41 of the clamping device 40. At this point, the mandrel 47 is shifted in direction 4 with the inserts 52a arranged in their expanded operative position from a retracted home position (FIG. 4), in which the tube 3 is arranged at a certain distance from the mandrel 47, to an advanced operative position (FIG. 5), in which the mandrel 47 is inserted in the end 2 with portions 49 and 50 engaging the tube 3 and the segment 39 respectively, and with the portions 51 and 52 engaging the segment 38.

Following the shift of the mandrel 47 to its advanced operative position, the flexible member 62 fluid-tightly couples with the end 2 so as to define, along with the liner 61 and the end 2, a pneumatic chamber 63 connected to a compressed air device by means of an inlet union 64 through which compressed air is fed inside the chamber 63 in order to socket form the segment 38 of the end 2 against the portion 52 of the mandrel 47 and against the collar 59.

The bell 55 is then shifted in direction 4 by means of the actuating device 60 so as to disengage the collar 59 from the end 2, allowing the segment 38 to fully adhere to the mandrel 47, and conferring to the end portion of the segment 38 the final socket shape tapered towards the axis 48.

At this point, the compressed air contained in the chamber 63 is relieved outwards through an outlet union 65, the newly formed segment 38 is cooled by a mixture of air and water fed into the chamber 63 through the union 64 and discharged outside the chamber 63 through the union 65, the inserts 52a are shifted to their contracted home position allowing the mandrel 47 to move again to its retracted home position without interfering with the newly socket formed end portion of the segment 38, the jaws 41 are opened, and the tube 3 with socket formed end 2 is unloaded from the station 10 and the machine 1.

The invention claimed is:

1. A method for socket-forming an end of a thermoplastic material tube, in particular of a polyolefinic material tube for pressurised fluids, the method comprising:
    inserting a first mandrel into the end of the thermoplastic material tube for widening without socket-forming said end;
    extracting the first mandrel from the widened end;
    stabilising the shape of said widened end; and
    inserting a second mandrel into the widened end for socket-forming said widened end.

2. A method according to claim 1, in which said end is widened starting at ambient temperature.

3. A method according to claim 1 and further comprising in sequence and in order, the steps of:
    heating said end; and
    widening without socket-forming said heated end.

4. A method according to claim 1 and further comprising the step of heating said end during said widening step.

5. A method according to claim 4, in which said end is heated starting from one of its internal surfaces.

6. A method according to claim 4, in which said end is heated starting from one of its external surfaces.

7. A method according to claim 4 and further comprising the step of monitoring the temperature of said end.

8. A method according to claim 1 and further comprising the step of cooling said widened end at the end of said socket-forming step.

9. A method according to claim 1, in which said end is widened by means of a dilating device acting on the end itself for a range of time so as to ensure the stabilisation of the widened end.

10. A method for socket-forming an end of a thermoplastic material tube, comprising:
    inserting a first mandrel into the end of the thermoplastic material tube to widen the end thereof;
    extracting the first mandrel from the widened end;
    stabilizing the shape of the widened end; and
    inserting a second mandrel, different than the first mandrel, into the widened end for socket-forming the widened end.

11. A method according to claim 10 in which said end is widened starting at ambient temperature.

12. A method according to claim 10 further comprising:
    heating said end; and
    widening without socket-forming said heated end.

13. A method according to claim 10 further comprising heating said end during said inserting.

14. A method according to claim 13, in which said end is heated starting from one of its internal surfaces.

15. A method according to claim 13 in which said end is heated starting from one of its external surfaces.

16. A method according to claim 13 further comprising monitoring the temperature of said end.

17. A method according to claim 10 further comprising: cooling said widened end at the end of said socket-forming.

18. A method according to claim 10, in which said end is widened by means of a dilating device acting on the end itself for a range of time so as to ensure the stabilization of the widened end.

* * * * *